United States Patent [19]
Takada et al.

[11] Patent Number: 6,143,242
[45] Date of Patent: Nov. 7, 2000

[54] STEEL FOR MACHINE STRUCTURAL USE EXCELLENT IN FRACTURE SPLITABILITY AND FATIGUE STRENGTH

[75] Inventors: Hiromasa Takada; Masayuki Shibata, both of Muroran; Motohide Mori; Atsuo Tanaka, both of Toyota, all of Japan

[73] Assignees: Nippon Steel Corporation, Tokyo; Toyoda Jidosha Kabushiki Kaisha, Toyota, both of Japan

[21] Appl. No.: 09/302,842

[22] Filed: Apr. 30, 1999

[30] Foreign Application Priority Data

May 1, 1998 [JP] Japan ................... 10-135906

[51] Int. Cl.[7] ............ C22C 38/60; C22C 38/12; C22C 38/14
[52] U.S. Cl. ............... 420/87; 420/84; 420/127
[58] Field of Search .............. 420/87, 84, 127

[56] References Cited

U.S. PATENT DOCUMENTS 5,922,145  7/1999  Watari et al. .................. 148/320

FOREIGN PATENT DOCUMENTS 9-003589  1/1997  Japan .

Primary Examiner—Deborah Yee
Attorney, Agent, or Firm—Kenyon & Kenyon

[57] ABSTRACT

A steel for machine structural use which realizes excellent fracture splitability and fatigue strength in its as-hot forged formed articles, and which comprises, based on weight, 0.2 to less than 0.35% of C, 0.1 to 1.1% of Si, 0.1 to less than 0.3% of Mn, 0.01 to 0.2% of P, 0.01 to 0.2% of S, greater than 0.2 to 0.5% of V, 0.01 to 0.1% of Ti, 0.005 to 0.02% of N and the balance of Fe and unavoidable impurities. The steel further comprises, if necessary, one or at least two of the following elements in the following amount or amounts: 0.005 to 0.05% of Al and/or 0.05 to 0.5% of Nb, 0.1 to 0.5% of Cr and 0.1 to 0.5% of Mo.

6 Claims, 1 Drawing Sheet

STEEL FOR MACHINE STRUCTURAL USE EXCELLENT IN FRACTURE SPLITABILITY AND FATIGUE STRENGTH

BACKGROUND OF THE INVENTION

1. Field of the Invention

The present invention relates to a steel used for hot forged formed articles which show little deformation during fracture, and which have excellent fatigue strength. The present invention relates to a steel for machine structural use which can be used without quenching and tempering after forming by hot forging.

2. Description of the Prior Art

In general, machine structural parts are completed by hot forging a steel material, and further conducting quenching and tempering, and machining. However, in recent years, a steel which is not quenched and tempered subsequent to forming by hot forging, namely, a non-heat treated steel for hot forging (hereinafter referred to as a non-heat treated steel) which realizes excellent mechanical properties in an as-hot-forged state has been widely used. Use of the non-heat treated steel results in reduction of the cost by omission of the heat treatment step, and overcoming the problem of quenching strain by omission of quenching.

On the other hand, in order to further obtain the cost-reduction merit, new working methods have been devised. A typical example thereof is a method for working a connecting rod which transmits the explosion force of an engine to a crank shaft. A connecting rod has heretofore been prepared by integrally or separately forming its cap portion and rod portion by hot forging, and finishing by machining. However, there has recently been adopted a method wherein the rod and the cap portion are fracture split by impact stretching, and the fracture surfaces are butted against each other, and joined together, because joining the cap and the rod portion requires working with high precision or because of the like matter. The non-heat treated steel for fracture split generally used is a steel containing about 0.7% of C. Deformation during fracture is suppressed and rejoining is made easy by using a high carbon steel.

On the other hand, the steel having a high carbon composition has a disadvantage of a low yield ratio and a low fatigue strength ratio, and it has a problem that its machinability is deteriorated when the tensile strength is increased to obtain a high yield strength and a high fatigue strength.

Furthermore, a number of non-heat treated steels having a relatively low carbon content and excellent fracture splitability are disclosed in Japanese Unexamined Patent Publications (Kokai) No. 9-268345, No. 9-31046, and the like. For example, the non-heat treated steel for hot forging disclosed in Japanese Unexamined Patent Publication (Kokai) No. 9-268345 contains less carbon (0.35 to 0.60%) than the currently used steel; the patent publication describes a method for producing a connecting rod wherein a notch groove having a stress concentration factor of at least 2 is provided to a connecting rod to be treated, and it is fracture split by impact load. Japanese Unexamined Patent Publication (Kokai) No. 9-310146 discloses a steel which similarly contains less carbon (0.30 to 0.60%) than the currently used steel, and in which a combination of elements for improving the proof stress and workability is restricted.

However, although these steels show ordinary mechanical properties and fracture splitability, they have a problem that they cannot respond to severe industrial requirements, particularly to the requirements of improving the fatigue strength.

SUMMARY OF THE INVENTION

An object of the present invention is to provide a steel which realizes excellent fracture splitability and fatigue strength in as-hot-forged formed articles.

In order to decrease the fatigue strength and increase the fracture splitability of the steel, namely, in order to decrease the deformation during fracture, increasing the carbon content is effective. However, a ferritic-pearlitic structure steel is generally lower in its yield ratio (yield strength/tensile strength) as the carbon content increases, and the fatigue strength is also lowered. Accordingly, in order to improve the disadvantage mentioned above, a method of embrittling ferrite having large ductility is effective. There are also a method of decreasing Mn which has the action of solid-solution strengthening, and a method of decreasing the ductility with a precipitation hardening element such as V. Moreover, a method of embrittling the grain boundaries by allowing the steel to contain a large amount of P is also effective. Although P lowers the high temperature ductility to cause hot working cracks, P can be advantageously utilized when used in a suitable amount. In order to realize an excellent fatigue strength ratio, a steel having a low carbon content and a high V content is suitable.

It has heretofore been thought that a steel having a carbon content as low as up to 0.4% is not practical from the standpoint of improving the fracturability. However, the present inventors have discovered that even a low carbon region steel having a carbon content as low as less than 0.35% can show satisfactory fracture splitability by an optimum combination of the methods of embrittling ferrite as mentioned above and dispersion of TiC particles, and the present invention thus has been achieved.

That is, the present invention provides a steel for machine structural use excellent in fracture splitability and fatigue strength, comprising, based on weight, 0.2 to less than 0.35% of C, 0.1 to 1.1% of Si, 0.1 to less than 0.3% of Mn, 0.01 to 0.2% of P, 0.01 to 0.2% of S, greater than 0.2 to 0.5% of V, 0.01 to 0.1% of Ti, 0.005 to 0.02% of N and the balance of Fe and unavoidable impurities. Moreover, the present invention provides a steel for machine structural use excellent in fracture splitability and fatigue strength, which further contains, if necessary, 0.005 to 0.05% of Al; or which further contains, for the purpose of improving the strength and forming a fine structure, one or at least two of the following compounds in the following content or contents: 0.05 to 0.5% of Nb, 0.1 to 0.5% of Cr and 0.1 to 0.5% of Mo. Furthermore, in order to improve the machinability, the steel of the present invention can contain at least one of Pb, Bi and Se in an amount of up to 0.4%, and up to 0.005% of Te and up to 0.003% of Ca.

Moreover, the present invention provides a steel for machine structural use which is a non-heat treated steel for hot forging, which is a steel having a composition as mentioned above, and which shows excellent mechanical properties in an as-hot forged state.

Furthermore, the steel for machine structural use of the present invention is used for connecting rods for engines.

DETAILED DESCRIPTION

Figure 1:
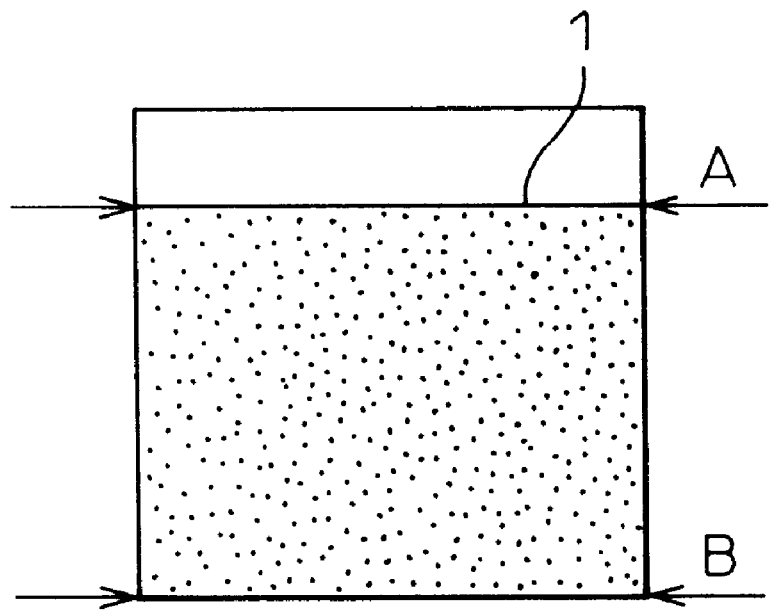
FIG. 1 is a view showing the fractured surface of a tensile fractured tensile test piece with a notch (cross section of 10×10 mm, with a notch 1.0 mm in radius and 2.0 mm deep).

Reasons for restricting the alloying components of the steel of the present invention will be explained below.

C: 0.2 to less than 0.35% by weight (hereinafter represented by %)

In order to ensure a necessary strength as parts and embrittle the steel so that the fracturability of the steel is improved, at least 0.2% of C is necessary. However, in order to realize a particularly high yield strength and fatigue strength, the upper limit must be restricted to less than 0.35%.

Si: 0.1 to 1.1%

Si is an element which solid-solution strengthens ferrite and lowers the ductility. In order to make the steel exhibit ductility lowering, at least 0.1% of Si is required. However, when the Si content exceeds 1.1%, the high temperature ductility lowers, and the steel tends to form cracks during rolling or forging.

Mn: 0.1 to less than 0.3%

Mn is usually used as a solid-solution strengthening element. The ductility of the steel of the present invention is lowered particularly by restricting the Mn content to less than 0.3%. Moreover, Mn forms MnS to improve the machinability. However, when the Mn content is made less than 0.1%, S forms a solid solution during heating the steel to embrittle the grain boundaries. As a result, the hot ductility of the steel is lowered, and the steel tends to form cracks and defects in the process of producing steel material and steel parts.

P: 0.01 to 0.2%

P is an element which segregates at grain boundaries to embrittle the steel, thereby improving the fracturability of the steel. However, when a large amount of P is added, the hot ductility of the steel is lowered, and consequently the steel tends to form cracks. Up to 0.2% of P is supplementarily added to the steel of the present invention if necessary. Moreover, even when embrittlement of the steel caused by P is not required, excessive reduction of the P content raises the production cost. Accordingly, the lower limit of the P content is restricted to 0.01%.

S: 0.01 to 0.2%

S is added to the steel to improve the machinability. In order to improve the machinability, at least 0.01% of S is required. However, the upper limit of the S content is defined to be 0.2% to suppress the anisotropy of the mechanical properties.

V: 0.2 to 0.5% and Nb: 0.05 to 0.5%

V and Nb are elements which improve the yield strength and fatigue strength of the steel principally by precipitation hardening, and which lower the ductility. In order to strengthen the steel, at least 0.2% of V is required, and at least 0.05% of Nb is added in accordance with the production conditions of the steel. When V and Nb are added each in an amount exceeding 0.5%, the effect elative to the cost is insignificant.

Ti: 0.01 to 0.1%

Ti forms carbonitride in the steel. A trace amount of the carbonitride acts to form a fine structure after hot forging, thereby increasing the ductility. On the other hand, addition of Ti in a relatively large amount forms coarse carbide, which functions as a crack propagation path during impact fracture to improve the fracturability. At least 0.01% of Ti is required when the effect of sufficiently improving the fracturability is expected; however, in order not to deteriorate the machinability, the upper limit of the Ti content is restricted to less than 0.1%.

N: 0.005 to 0.02%

N forms VN and NbN to form fine structure in steel materials and hot worked materials, and increases the ferrite amount to enhance the ductility, thereby improving the yield ratio and fatigue strength ratio. On the other hand, when the ferrite amount is excessively increased, the ductility is increased, and the fracturability is deteriorated. In order to improve the fracturability, the N content is restricted to up to 0.02%, it is desirably up to 0.01%. When the N content is less than 0.005%, production of the steel becomes costly.

Cr: 0.1 to 0.5%, Mo: 0.1 to 0.5%

Cr and Mo are added each in an amount of at least 0.1% when control of the strength is required. However, in order to prevent the steel from deteriorating in its fracturability due to structure refining, the upper limit of the content of Cr and that of the content of Mo are each restricted to 0.5%.

Al: 0.005 to 0.05%

Al is a deoxidizing element. Although an ordinary steel for forging is produced by Al deoxidation, Al is unavoidably dispersed into the steel when Al deoxidation is conducted, and the machinability may lower. Al deoxidation is not conducted when the steel is required to have particularly excellent machinability (first invention). However, Al can be added in an amount of at least 0.005% when the steel is to be lightly machined and the machinability causes no problem; the effect of deoxidation is saturated when Al is added in an amount exceeding 0.05%.

In addition, optional addition of the following elements in the following amounts for the purpose of improving the machinability poses no obstacle: Pb, Bi and Se each in an amount of up to 0.4%; up to 0.005% of Te; and up to 0.003% of Ca.

EXAMPLE

Examples of the present invention are explained below while being compared with comparative examples.

Steels having compositions as shown in Tables 1 and 2 were prepared with a 150-kg vacuum melting furnace, and forged to form square bars having a cross section, 40×40 mm. The square bars were used as steel materials.

The steel materials were heated to 1,523 K, hot forged once to have a thickness of 20 mm, and allowed to cool. All the steel structures were ferritic-pearlitic. From the forged steels, (1) tensile test pieces each having a diameter of 9 mm in the parallel portion, and (2) tensile test pieces (for measuring deformation amounts) each having a cross section of 10×10 mm in the bar portion and a notch 1.0 mm in radius and 2.0 mm deep were prepared. Each of the tensile test pieces with a notch was impulsively stretched at a tensile rate of 1.0 m/sec to be fractured. After fracture, the deformation amounts of the fractured surface in the direction parallel to the notch, namely, the total of the changed amounts of the width of the notch bottom 1, as shown in FIG. 1, and that of the smoothed side (changes in the lengths of A and B in FIG. 1) was evaluated as an index of the fracture (amount of deformation in Tables 1 and 2). In addition, each of the tensile test pieces with a notch was a simulation of the fractured portion of a connecting rod.

As shown in Tables 1 and 2, the steels of the present invention have a tensile strength of 715 to 1,062 MPa and a fatigue strength ratio of at least 0.50. Moreover, a conventional QT steel (No. 1: quenched at 850° C. and tempered at 600° C.) shows a deformation amount of 1.12 mm. On the other hand, the steels of the present invention show a deformation amount of 0.27 to 0.48 mm which is comparable to that of 0.23 mm for the 0.7% C steel (No. 2) used as a fracture split non-heat treated steel. Of comparative steels, the low carbon steel (No. 13), the high Mn steel (No.

16), the high N steel (No. 18) and the high Al steel (No. 22) each show a large deformation amount. The steel (No. 14) shows a low yield ratio and a low fatigue strength ratio because of its high C content. Although the high Si steel (No. 15) has excellent quality, it shows poor hot ductility because of its high Si content, and cracks and defects tend to be formed during production of steel bars and hot forging. Therefore, the steel is inappropriate. Although the steel (No. 17) has a low N content and excellent quality, its refining is costly because of the low N content. The steel (No. 19) has an excessive Ti content, and its fatigue strength ratio is lowered. The structures of the steels (Nos. 36 to 38) become bainite, and they each show a poor yield ratio and a poor fatigue strength ratio.

From the results as explained above, the steel of the present invention in as-hot forged formed articles has been confirmed to have excellent fracture splitability and fatigue strength.

TABLE 1

| No. | Application | C | Si | Mn | P | S | V | Ti | Al | Cr |
|---|---|---|---|---|---|---|---|---|---|---|
| 1 | Comp. QT steel | 0.54 | 0.25 | 0.80 | 0.016 | 0.018 | — | — | 0.024 | 0.10 |
| 2 | Comp. non-heat treated steel | 0.72 | 0.20 | 0.52 | 0.020 | 0.061 | 0.044 | — | 0.033 | 0.06 |
| 3 | Steel of first invention | 0.34 | 0.12 | 0.22 | 0.045 | 0.011 | 0.243 | 0.044 | — | — |
| 4 | Steel of first invention | 0.22 | 1.06 | 0.22 | 0.044 | 0.010 | 0.349 | 0.072 | — | — |
| 5 | Steel of first invention | 0.29 | 0.55 | 0.25 | 0.045 | 0.012 | 0.355 | 0.052 | — | — |
| 6 | Steel of first invention | 0.30 | 0.45 | 0.24 | 0.011 | 0.015 | 0.250 | 0.038 | — | — |
| 7 | Steel of first invention | 0.28 | 0.32 | 0.13 | 0.021 | 0.011 | 0.205 | 0.040 | — | — |
| 8 | Steel of first invention | 0.32 | 0.66 | 0.29 | 0.050 | 0.103 | 0.242 | 0.044 | — | — |
| 9 | Steel of first invention | 0.32 | 0.70 | 0.24 | 0.178 | 0.055 | 0.297 | 0.045 | — | — |
| 10 | Steel of first invention | 0.21 | 0.24 | 0.26 | 0.019 | 0.191 | 0.496 | 0.082 | — | — |
| 11 | Steel of first invention | 0.31 | 0.78 | 0.27 | 0.064 | 0.020 | 0.228 | 0.015 | — | — |
| 12 | Steel of first invention | 0.31 | 0.78 | 0.24 | 0.062 | 0.023 | 0.227 | 0.095 | — | — |
| 13 | Comp. steel | 0.15 | 0.95 | 0.29 | 0.015 | 0.051 | 0.302 | 0.045 | — | — |
| 14 | Comp. steel | 0.51 | 0.95 | 0.24 | 0.021 | 0.055 | 0.150 | 0.044 | — | — |
| 15 | Comp. steel | 0.28 | 2.30 | 0.22 | 0.047 | 0.054 | 0.252 | 0.045 | — | — |
| 16 | Comp. steel | 0.29 | 0.55 | 0.63 | 0.049 | 0.053 | 0.255 | 0.045 | — | — |
| 17 | Comp. steel | 0.30 | 0.99 | 0.25 | 0.021 | 0.055 | 0.288 | 0.051 | — | — |
| 18 | Comp. steel | 0.33 | 0.97 | 0.27 | 0.017 | 0.052 | 0.291 | 0.060 | — | — |
| 19 | Comp. steel | 0.31 | 0.78 | 0.25 | 0.063 | 0.045 | 0.235 | 0.263 | — | — |
| 20 | Steel of second invention | 0.31 | 0.80 | 0.26 | 0.055 | 0.021 | 0.212 | 0.051 | 0.021 | — |
| 21 | Steel of second invention | 0.32 | 0.76 | 0.27 | 0.055 | 0.020 | 0.230 | 0.053 | 0.047 | — |
| 22 | Comp. steel | 0.30 | 0.75 | 0.27 | 0.060 | 0.044 | 0.233 | 0.049 | 0.112 | — |

| No. | Application | Mo | Nb | T.N | Free cutting elements other than S | Tensile strength (MPa) | Yield ratio | Fatigue Tensile ratio | Amt. of deformation (mm) |
|---|---|---|---|---|---|---|---|---|---|
| 1 | Comp. QT steel | — | — | 0.0075 | — | 748 | 0.78 | 0.47 | 1.12 |
| 2 | Comp. non-heat treated steel | — | — | 0.0084 | — | 917 | 0.58 | 0.40 | 0.23 |
| 3 | Steel of first invention | — | — | 0.0055 | — | 836 | 0.74 | 0.50 | 0.41 |
| 4 | Steel of first invention | — | — | 0.0062 | — | 922 | 0.79 | 0.56 | 0.37 |
| 5 | Steel of first invention | — | — | 0.0066 | — | 987 | 0.77 | 0.55 | 0.45 |
| 6 | Steel of first invention | — | — | 0.0051 | — | 811 | 0.74 | 0.52 | 0.38 |
| 7 | Steel of first invention | — | — | 0.0073 | — | 715 | 0.73 | 0.50 | 0.34 |
| 8 | Steel of first invention | — | — | 0.0140 | — | 852 | 0.73 | 0.51 | 0.48 |
| 9 | Steel of first invention | — | — | 0.0100 | — | 991 | 0.75 | 0.53 | 0.45 |
| 10 | Steel of first invention | — | — | 0.0177 | — | 1062 | 0.79 | 0.56 | 0.40 |
| 11 | Steel of first invention | — | — | 0.0074 | — | 844 | 0.73 | 0.50 | 0.47 |
| 12 | Steel of first invention | — | — | 0.0076 | — | 826 | 0.73 | 0.50 | 0.46 |

TABLE 1-continued

| No. | Application | Mo | Nb | T.N | Free cutting elements other than S | Tensile strength (MPa) | Yield ratio | Fatigue strength ratio | Amt. of deformation (mm) |
|---|---|---|---|---|---|---|---|---|---|
| 13 | Comp. steel | — | — | 0.0062 | — | 772 | 0.79 | 0.56 | 0.95 |
| 14 | Comp. steel | — | — | 0.0065 | — | 889 | 0.65 | 0.41 | 0.38 |
| 15 | Comp. steel | — | — | 0.0074 | — | 886 | 0.75 | 0.52 | 0.43 |
| 16 | Comp. steel | — | — | 0.0089 | — | 905 | 0.74 | 0.52 | 0.99 |
| 17 | Comp. steel | — | — | 0.0042 | — | 891 | 0.75 | 0.53 | 0.39 |
| 18 | Comp. steel | — | — | 0.0211 | — | 925 | 0.74 | 0.53 | 1.01 |
| 19 | Comp. steel | — | — | 0.0070 | — | 840 | 0.73 | 0.46 | 0.28 |
| 20 | Steel of second invention | — | — | 0.0071 | — | 798 | 0.73 | 0.50 | 0.43 |
| 21 | Steel of second invention | — | — | 0.0077 | — | 845 | 0.73 | 0.50 | 0.44 |
| 22 | Comp. steel | — | — | 0.0062 | — | 830 | 0.73 | 0.45 | 0.93 |

TABLE 2

| No. | Application | C | Si | Mn | P | S | V | Ti | Al | Cr | Mo | Nb | T.N | Free cutting elements other than S | Tensile strength (MPa) | Yield ratio | Fatigue strength ratio | Amt. of deformation (mm) |
|---|---|---|---|---|---|---|---|---|---|---|---|---|---|---|---|---|---|---|
| 23 | Steel of third invention | 0.34 | 1.03 | 0.26 | 0.022 | 0.051 | 0.200 | 0.048 | — | 0.14 | — | — | 0.0065 | — | 815 | 0.71 | 0.50 | 0.42 |
| 24 | Steel of third invention | 0.33 | 0.88 | 0.22 | 0.028 | 0.062 | 0.210 | 0.051 | — | 0.46 | — | — | 0.0076 | — | 846 | 0.72 | 0.50 | 0.37 |
| 25 | Steel of third invention | 0.30 | 0.90 | 0.22 | 0.022 | 0.060 | 0.236 | 0.050 | — | — | — | 0.05 | 0.0072 | — | 808 | 0.74 | 0.51 | 0.41 |
| 26 | Steel of third invention | 0.20 | 0.95 | 0.25 | 0.025 | 0.055 | 0.235 | 0.011 | — | — | — | 0.46 | 0.0064 | — | 732 | 0.77 | 0.54 | 0.42 |
| 27 | Steel of third invention | 0.27 | 0.20 | 0.23 | 0.024 | 0.054 | 0.201 | 0.040 | — | — | | | | | | | | |
| 28 | Steel of third invention | 0.32 | 0.89 | 0.20 | 0.025 | 0.053 | 0.238 | 0.022 | 0.035 | — | | | | | | | | |
| 29 | Steel of third invention | 0.33 | 0.64 | 0.18 | 0.055 | 0.029 | 0.247 | 0.052 | — | 0.25 | | | | | | | | |
| 30 | Steel of third invention | 0.31 | 0.62 | 0.15 | 0.058 | 0.027 | 0.297 | 0.053 | — | 0.20 | | | | | | | | |
| 31 | Steel of third invention | 0.29 | 0.27 | 0.16 | 0.058 | 0.027 | 0.302 | 0.034 | — | — | | | | | | | | |
| 32 | Steel of third invention | 0.28 | 0.60 | 0.18 | 0.061 | 0.022 | 0.300 | 0.070 | — | 0.15 | | | | | | | | |
| 33 | Steel of third invention | 0.32 | 0.88 | 0.21 | 0.098 | 0.025 | 0.323 | 0.048 | 0.022 | 0.32 | | | | | | | | |
| 34 | Steel of third invention | 0.24 | 0.90 | 0.16 | 0.100 | 0.026 | 0.268 | 0.049 | 0.023 | 0.31 | | | | | | | | |
| 35 | Steel of third invention | 0.23 | 0.85 | 0.22 | 0.096 | 0.021 | 0.270 | 0.075 | — | — | | | | | | | | |
| 36 | Comp. steel | 0.34 | 0.89 | 0.22 | 0.050 | 0.071 | 0.271 | 0.045 | — | 1.20 | | | | | | | | |
| 37 | Comp. steel | 0.23 | 0.85 | 0.28 | 0.051 | 0.074 | 0.214 | 0.046 | — | — | | | | | | | | |
| 38 | Comp. steel | 0.31 | 0.92 | 0.27 | 0.047 | 0.074 | 0.220 | 0.046 | — | — | | | | | | | | |
| 39 | Steel of first invention | 0.30 | 0.28 | 0.24 | 0.050 | 0.051 | 0.232 | 0.050 | — | — | | | | | | | | |
| 40 | Steel of second invention | 0.29 | 0.75 | 0.25 | 0.056 | 0.054 | 0.235 | 0.051 | 0.036 | — | | | | | | | | |
| 41 | Steel of first invention | 0.29 | 0.44 | 0.29 | 0.055 | 0.054 | 0.305 | 0.059 | — | — | | | | | | | | |
| 42 | Steel of first invention | 0.30 | 0.39 | 0.28 | 0.050 | 0.100 | 0.301 | 0.055 | 0.035 | 0.15 | | | | | | | | |

TABLE 2-continued

| | | | | | | | | | |
|---|---|---|---|---|---|---|---|---|---|
| 27 | Steel of third invention | 0.11 | — | 0.0062 | — | 693 | 0.73 | 0.50 | 0.37 |
| 28 | Steel of third invention | 0.49 | — | 0.0067 | — | 839 | 0.73 | 0.51 | 0.34 |
| 29 | Steel of third invention | — | 0.05 | 0.0058 | — | 872 | 0.73 | 0.51 | 0.34 |
| 30 | Steel of third invention | 0.20 | — | 0.0078 | — | 923 | 0.75 | 0.54 | 0.28 |
| 31 | Steel of third invention | 0.32 | 0.06 | 0.0066 | — | 874 | 0.76 | 0.54 | 0.27 |
| 32 | Steel of third invention | 0.20 | 0.05 | 0.0069 | — | 904 | 0.76 | 0.55 | 0.35 |
| 33 | Steel of third invention | — | — | 0.0071 | — | 1029 | 0.76 | 0.54 | 0.37 |
| 34 | Steel of third invention | 0.22 | — | 0.0082 | — | 867 | 0.76 | 0.54 | 0.30 |
| 35 | Steel of third invention | 0.21 | 0.06 | 0.0058 | — | 836 | 0.77 | 0.55 | 0.33 |
| 36 | Comp. steel | — | — | 0.0065 | — | 1038 | 0.64 | 0.45 | 0.62 |
| 37 | Comp. steel | 1.02 | — | 0.0065 | — | 727 | 0.63 | 0.46 | 0.73 |
| 38 | Comp. steel | — | 0.32 | 0.0121 | — | 808 | 0.64 | 0.46 | 0.69 |
| 39 | Steel of first invention | — | — | 0.0065 | Pb: 0.18, Ca: 0.0011 | 784 | 0.73 | 0.51 | 0.37 |
| 40 | Steel of second invention | — | — | 0.0099 | Pb: 0.05, Ca: 0.0010 | 820 | 0.74 | 0.51 | 0.46 |
| 41 | Steel of first invention | — | — | 0.0116 | Bi: 0.07 | 916 | 0.76 | 0.55 | 0.42 |
| 42 | Steel of third invention | — | — | 0.0075 | Te: 0.013 | 915 | 0.76 | 0.54 | 0.44 |

What is claimed is:

1. A steel for machine structural use excellent in fracture splitability and fatigue strength, comprising, based on weight, 0.2 to less than 0.35% of C, 0.1 to 1.1% of Si, 0.1 to less than 0.3% of Mn, 0.01 to 0.2% of P, 0.01 to 0.2% of S, greater than 0.2 to 0.5% of V, 0.01 to 0.1% of Ti, 0.005 to 0.02% of N and the balance of Fe and unavoidable impurities.

2. A steel for machine structural use excellent in fracture splitability and fatigue strength, comprising, based on weight, 0.2 to less than 0.35% of C, 0.1 to 1.1% of Si, 0.1 to less than 0.3% of Mn, 0.01 to 0.2% of P, 0.01 to 0.2% of S, greater than 0.2 to 0.5% of V, 0.01 to 0.1% of Ti, 0.005 to 0.05% of Al, 0.005 to 0.02% of N and the balance of Fe and unavoidable impurities.

3. The steel for machine structural use excellent in fracture splitability and fatigue strength according to claim 1, wherein the steel further comprises, based on weight, one or at least two of the following elements in the following content or contents: 0.05 to 0.5% of Nb, 0.1 to 0.5% of Cr and 0.1 to 0.5% of Mo.

4. The steel for machine structural use excellent in fracture splitability and fatigue strength according to any one of claim 1, wherein the steel further comprises, based on weight, at least one of Pb, Bi and Se in an amount of up to 0.4%, up to 0.005% of Te and up to 0.003% of Ca.

5. The steel for machine structural use according to any one of claim 1, wherein the steel is non-heat treated and used for hot forging, and it has excellent mechanical properties in an as-hot-forged state.

6. The steel for machine structural use according to any one of claim 1, wherein the applications of the steel include connecting rods for engines.

* * * * *